US009345089B2

United States Patent
Van Damme (10) Patent No.: US 9,345,089 B2
(45) Date of Patent: May 17, 2016

(54) APPARATUS FOR CONTROLLING ON AND OFF STATES OF LIGHT EMITTING DIODE LAMP

(71) Applicant: KONINKLIJKE PHILIPS N.V., Eindhoven (NL)

(72) Inventor: Fabio Jacobus Maria Van Damme, Axel (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/430,924

(22) PCT Filed: Oct. 1, 2013

(86) PCT No.: PCT/IB2013/059046
§ 371 (c)(1),
(2) Date: Mar. 25, 2015

(87) PCT Pub. No.: WO2014/053997
PCT Pub. Date: Apr. 10, 2014

(65) Prior Publication Data
US 2015/0264767 A1   Sep. 17, 2015

Related U.S. Application Data

(60) Provisional application No. 61/708,720, filed on Oct. 2, 2012.

(51) Int. Cl.
*H05B 33/08* (2006.01)
(52) U.S. Cl.
CPC ........ *H05B 33/0845* (2013.01); *H05B 33/0812* (2013.01); *H05B 33/0824* (2013.01)
(58) Field of Classification Search
CPC ........... H05B 33/0845; H05B 33/0812; H05B 33/0824
See application file for complete search history.

(56) References Cited

U.S. PATENT DOCUMENTS

| 2005/0162101 | A1* | 7/2005 | Leong | F21K 9/00 315/291 |
| 2008/0197786 | A1* | 8/2008 | Schaible | H05B 33/0815 315/224 |
| 2010/0207712 | A1* | 8/2010 | Braune | H01H 71/04 335/17 |
| 2010/0289428 | A1* | 11/2010 | Frazier | F21K 9/00 315/294 |

FOREIGN PATENT DOCUMENTS

WO   2011141856 A1   11/2011
WO   2012052875 A1   4/2012

OTHER PUBLICATIONS

"The Smart Starter: A Smart Idea", www.smartstarter.eu/smart.ca.html.

* cited by examiner

*Primary Examiner* — Tung X Le
*Assistant Examiner* — Raymond R Chai (57) ABSTRACT

Apparatuses for controlling light emitting diode lamps in serial connections are disclosed. In one embodiment, the apparatus comprises first circuits coupled to terminals of the apparatuses for, in lamp-off states, providing high impedances between the terminals and for, in lamp-on states, providing low impedances between the terminals during first parts of durations of the lamp-on states, second circuits for controlling the first circuits, and third circuits for storing energy for feeding the second circuits. In at least one embodiment, the second circuit further comprises a comparator circuit for comparing a voltage signal present across the third circuit with a threshold value, said control of the amount of energy being performed in response to a comparison result from the comparator circuit.

13 Claims, 5 Drawing Sheets

APPARATUS FOR CONTROLLING ON AND OFF STATES OF LIGHT EMITTING DIODE LAMP

CROSS-REFERENCE TO PRIOR APPLICATIONS

This application is the U.S. National Phase application under 35 U.S.C. §371 of International Application No. PCT/IB13/059046, filed on Oct. 1, 2013, which claims the benefit of U.S. Provisional Patent Application No. 61/708,720, filed on Oct. 2, 2012. These applications are hereby incorporated by reference herein.

FIELD OF THE INVENTION

The invention relates to an apparatus for controlling a lamp comprising at least one light emitting diode, the apparatus and the lamp being serially connectable. The invention further relates to a device comprising the apparatus and further comprising the lamp and/or a fluorescent ballast and/or a driver.

Examples of such a device are lamps and parts thereof and fluorescent ballasts and parts thereof and drivers and parts thereof.

BACKGROUND OF THE INVENTION

When replacing a fluorescent lamp by a lamp comprising at least one light emitting diode, a starter, that was connected in parallel to the fluorescent lamp, may become serially connected to the light emitting diode lamp, owing to the fact that the wirings inside the fluorescent lamp and the light emitting diode lamp are different from each other. A starter that is connected in parallel to a fluorescent lamp receives the same voltage signal from a mains supply as the fluorescent lamp, when the mains supply is switched-on. A starter that is connected serially to a light emitting diode lamp receives the same current signal from a mains supply as the light emitting diode lamp, when the mains supply is switched-on.

Such a starter, when being connected serially to a light emitting diode lamp, is usually a simple connection, also called dummy starter, owing to the fact that a light emitting diode lamp does not require a starter. This simple connection or dummy starter can be advantageously replaced by an apparatus for controlling the light emitting diode lamp. Alternatively, such an apparatus may form part of the light emitting diode lamp or of a fluorescent ballast or of a driver.

SUMMARY OF THE INVENTION

It is an object of the invention to provide an improved apparatus for controlling a lamp comprising at least one light emitting diode, the apparatus and the lamp being serially connectable. It is a further object of the invention to provide an improved device.

According to a first aspect, an apparatus is provided for controlling a lamp comprising at least one light emitting diode, the apparatus and the lamp being serially connectable, the apparatus comprising a first circuit coupled to terminals of the apparatus for, in a lamp-off state, providing a relatively high impedance between the terminals and for, in a lamp-on state, providing a relatively low impedance between the terminals during a first part of a duration of the lamp-on state, a value of the relatively high impedance being at least ten times larger than a value of the relatively low impedance, a second circuit for controlling the first circuit, and a third circuit coupled to the first circuit for storing energy for feeding the second circuit.

The first circuit introduces, in a lamp-off state, a relatively high impedance between the terminals of the apparatus. As a result, in the lamp-off state, a relatively small current will flow through the apparatus and the light emitting diode lamp. The first circuit introduces, in a lamp-on state, a relatively low impedance between the terminals of the apparatus during a first part of a duration of the lamp-on state, a value of the relatively high impedance being at least ten times larger than a value of the relatively low impedance. As a result, in the lamp-on state, a relatively large current will flow through the apparatus and the light emitting diode lamp, during the first part of the duration of the lamp-on state. The second circuit controls the first circuit, and thereby controls the lamp-off state and the lamp-on state. The third circuit stores energy for feeding the second circuit. This way, an apparatus has been created that allows advanced control of the light emitting diode lamp, as long as the mains supply is switched-on.

Such advanced control may for example comprise turning the light emitting diode lamp on and off according to a pre-programmed scene, keeping track of date and time even when the mains supply is switched-off, adjusting summer-time and winter-time, and setting and/or programming a Greenwich Mean Time, and these are great advantages.

The light emitting diode lamp may for example further comprise a driver for driving the at least one light emitting diode. Alternatively, the driver may be located outside the light emitting diode lamp. The at least one light emitting diode may comprise one or more light emitting diodes of whatever kind and in whatever combination.

When replacing the fluorescent lamp by the light emitting diode lamp, a passive fluorescent ballast also called an electromagnetic ballast as used for driving the fluorescent lamp may be kept or removed. The apparatus functions independently from a presence of the passive fluorescent ballast and from a construction of the passive fluorescent ballast when present.

An embodiment of the apparatus is defined by said controlling of the first circuit comprising a control of the lamp-off state and the lamp-on state and a control of an amount of the energy stored in the third circuit, and said storing of the energy comprising a storage during a duration of the lamp-off state and a storage during a second part of the duration of the lamp-on state, the second part being at least ten times smaller than the first part. The second circuit may control the lamp-off state and the lamp-on state and the amount of the energy stored in the third circuit. The third circuit may store the energy during the entire duration of the lamp-off state and during the second part of the duration of the lamp-on state. By having made the second part (during which energy is stored) at least ten times smaller than the first part (during which a relatively low impedance is introduced between the terminals of the apparatus), the energy storage during the lamp-on state will result in a short interruption of the light output from the light emitting diode lamp during the lamp-on state, which interruption is preferably shorter than visible to the human eye. The explanation here is that when the light emitting diode lamp is switched-on, a largest part of the voltage signal presented to a serial connection of the light emitting diode lamp and the apparatus will be available to the light emitting diode lamp, and a smallest and possibly insufficient part of this voltage signal will be available to the apparatus. The interruption allows this smallest part to be sufficiently increased for a small duration. Further, a driver may comprise a buffer to be able to overcome a small power dip. Said buffer also prevents that a short interruption of the light output this time resulting from said dip may become visible to the human eye.

An embodiment of the apparatus is defined by the second circuit comprising a programmable microcontroller for said control of the lamp-off state and the lamp-on state. Programmable microcontrollers are well suited for turning the light emitting diode lamp on and off according to a pre-programmed scene, keeping track of date and time even when the mains supply is switched-off, adjusting summer-time and winter-time, and setting and/or programming a Greenwich Mean Time etc. Preferably, a battery is available inside or outside the apparatus for providing energy to a clock such as for example a real time clock coupled to the programmable microcontroller to keep the real time clock functioning when the mains supply is switched-off.

An embodiment of the apparatus is defined by the programmable microcontroller having a comparison function for comparing a voltage signal present across the third circuit with a threshold value, said control of the amount of energy being performed in response to a comparison result from the programmable microcontroller. Programmable microcontrollers are well suited for implementing comparison functions that save hardware. A relatively low amplitude value of the voltage signal present across the third circuit is an indication that additional energy is required. A relatively high amplitude value of the voltage signal present across the third circuit is an indication that sufficient energy is available.

An embodiment of the apparatus is defined by the second circuit comprising a comparator circuit for comparing a voltage signal present across the third circuit with a threshold value, said control of the amount of energy being performed in response to a comparison result from the comparator circuit. This comparator circuit is an alternative to the comparison function in the programmable microcontroller and allows the amount of energy to be controlled independently from the programmable microprocessor.

An embodiment of the apparatus is defined by further comprising
a fourth circuit for increasing a value of a voltage signal present across the third circuit. The fourth circuit allows the value of the voltage signal present across the third circuit to be increased.

An embodiment of the apparatus is defined by further comprising
a fifth circuit for deriving from a voltage signal present across the third circuit a well defined and stabilized voltage signal for said feeding. The fifth circuit allows the voltage signal present across the third circuit to be stabilized.

An embodiment of the apparatus is defined by the terminals of the apparatus being coupled to first and second primary terminals of the first circuit that comprises
a first transistor having a first main electrode coupled to the first primary terminal of the first circuit and having a second main electrode coupled to one side of a first resistor,
a second transistor having a first main electrode coupled to a control electrode of the first transistor and having a control electrode coupled to the one side of the first resistor and having a second main electrode coupled to another side of the first resistor and to one side of a first diode,
a third transistor having a first main electrode coupled to the other side of the first resistor and having a second main electrode coupled to the one side of the first resistor and to one side of a second resistor and having a control electrode coupled to another side of the second resistor,
a fourth transistor having a first main electrode coupled to the other side of the second resistor and having a second main electrode coupled to the second primary terminal of the first circuit and having a control electrode for receiving a first control signal from the second circuit, and
a fifth transistor having a first main electrode coupled to the one side of the first resistor and having a second main electrode coupled to the second primary terminal of the first circuit and having a control electrode for receiving a second control signal from the second circuit.

An embodiment of the apparatus is defined by the third circuit comprising a first capacitor having one side coupled to another side of the first diode and having another side coupled to the second primary terminal of the first circuit.

An embodiment of the apparatus is defined by the first circuit further comprising
a third resistor having one side coupled to the first primary terminal of the first circuit,
a second diode having one side coupled to another side of the third resistor,
a fourth resistor having one side coupled to another side of the second diode and having another side coupled to the control electrode of the first transistor,
a third diode having one side coupled to the other side of the second diode and having another side coupled to the second primary terminal of the first circuit,
a second capacitor coupled in parallel to the third diode,
a fifth resistor having one side coupled to the one side of the third diode, and
a third capacitor having one side coupled to another side of the fifth resistor and having another side coupled to the second primary terminal of the first circuit.

An embodiment of the apparatus is defined by the second circuit comprising
a gate having a first input for receiving the first control signal and having an output for providing the second control signal,
a sixth transistor having a first main electrode coupled to a second input of the gate and having a second main electrode coupled to the one side of the first capacitor,
a sixth resistor having one side coupled to the one side of the first capacitor and having another side coupled to a control electrode of the sixth transistor, and
a shunt regulator having a first main electrode coupled to the control electrode of the sixth transistor and having a second main electrode coupled to the second primary terminal of the first circuit and having a control electrode for receiving the second control signal.

An embodiment of the apparatus is defined by a fourth circuit comprising
a serial connection of a fourth, a fifth, a sixth and a seventh diode, one side of the serial connection being coupled to the one side of the first capacitor and another side of the serial connection being coupled to the one side of the third capacitor,
a Schmitt trigger having a first output coupled via a fourth capacitor to an interconnection between the fifth and sixth diodes and coupled to one side of a seventh resistor and having a second output coupled via a fifth capacitor to an interconnection between the fourth and fifth diodes and via a sixth capacitor to an interconnection between the sixth and seventh diodes, another side of the seventh resistor being coupled to a first input of the Schmitt trigger and to one side of a seventh capacitor, another side of the seventh capacitor being coupled to the second primary terminal of the first circuit, and the first output further being coupled to a second input of the Schmitt trigger.

An embodiment of the apparatus is defined by a fifth circuit comprising a voltage regulator having an input coupled to the one side of the first capacitor and having an output for providing a well defined and stabilized voltage signal.

In the lamp-off state, the third and fourth transistors are not conductive (low first control signal) and the fifth transistor is not conductive (low second control signal), the first transistor is operating linearly, the first resistor and the second transistor are operating as current limiters, the relatively high impedance is present between the terminals of the apparatus, and the first capacitor is charged all the time. In the lamp-on state, during the first part of the duration of the lamp-on state, the first and third and fourth transistors are highly conductive (high first control signal), as a result the current limiting functions of the first resistor and the second transistor are disabled, the fifth transistor is highly conductive (high second control signal), the relatively low impedance is present between the terminals of the apparatus, and the first capacitor is de-charged. As soon as a decreasing amplitude of the voltage signal across the first capacitor has reached the relatively low value, the fifth transistor becomes non-conductive (low second control signal), and the first capacitor is charged, during the second part of the duration of the lamp-on state, until the increasing amplitude of the voltage signal across the first capacitor has reached the relatively high value, then the fifth transistor becomes highly conductive again (high second control signal) and a next first part of the duration of the lamp-on state has started etc. Usually, the combination of the first and second parts of the duration of the lamp-on state will repeat itself over and over again during the lamp-on state, relatively periodically.

The third resistor and the second diode provide a start-up function. The second and third capacitors and the fifth resistor provide a filter function. The fourth circuit is based on an oscillator comprising the Schmitt trigger with a feedback loop with a time dependency and is based on the diode-capacitor circuit for multiplying voltages. This fourth circuit is also called a charge-pump.

An embodiment of the apparatus is defined by the terminals of the apparatus being coupled to the first and second primary terminals of the first circuit via a rectifier, inputs of the rectifier being coupled to the terminals of the apparatus and outputs of the rectifier being coupled to the first and second primary terminals of the first circuit. The rectifier such as for example a diode bridge may form part of the apparatus or not.

According to a second aspect, a device is provided comprising the apparatus and further comprising the lamp and/or a fluorescent ballast.

An insight is that a light emitting diode lamp may need advanced control. A basic idea is that the apparatus is to be provided with a first circuit for lamp-state dependent impedances, a second circuit for controlling the first circuit, and a third circuit for storing energy for feeding the second circuit.

A problem to provide an improved apparatus has been solved. A further advantage is that advanced control of the light emitting diode lamp increases a user-friendliness and an environmental friendliness of the light emitting diode lamp and reduces a payback period when energy is saved.

These and other aspects of the invention will be apparent from and elucidated with reference to the embodiments described hereinafter.

DETAILED DESCRIPTION OF EMBODIMENTS

Figure 1:
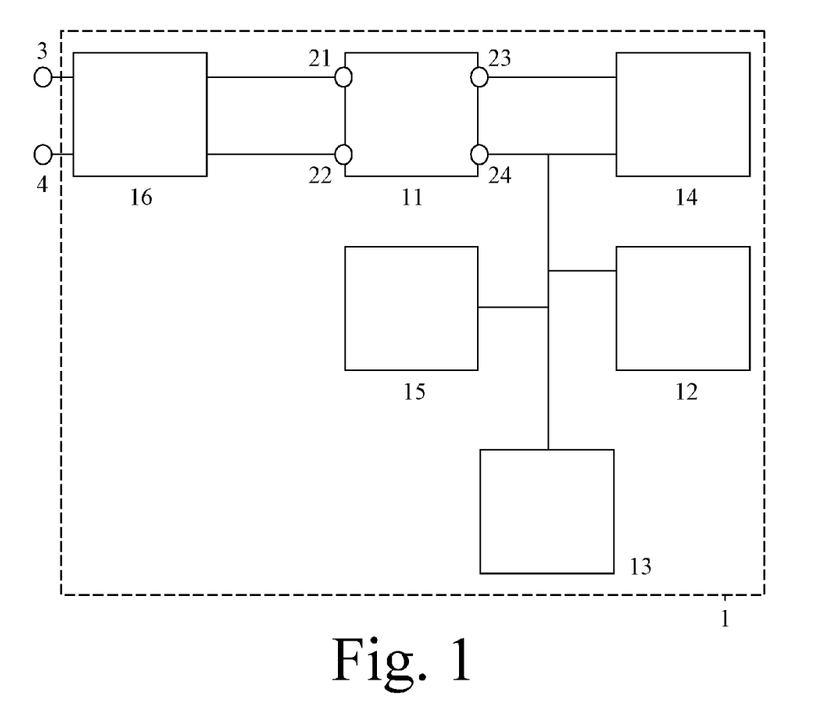
FIG. 1 shows an embodiment of an apparatus.

In the FIG. 1, an embodiment of an apparatus 1 is shown. The apparatus 1 is designed to control a lamp 2 that comprises one or more light emitting diodes. The apparatus 1 and the lamp 2 are to be connected serially, such that both receive the same current signal from a mains supply, when this mains supply is switched-on. The apparatus 1 comprises a first circuit 11 coupled to terminals 3, 4 of the apparatus 1 for, in a lamp-off state, providing a relatively high impedance between the terminals 3, 4 and for, in a lamp-on state, providing a relatively low impedance between the terminals 3, 4 during a first part of a duration of the lamp-on state. A value of the relatively high impedance should be at least ten times larger than a value of the relatively low impedance. The apparatus 1 further comprises a second circuit 12 for controlling the first circuit 11, and a third circuit 13 for storing energy for feeding the second circuit 12.

Said controlling of the first circuit 11 may comprise a control of the lamp-off state and the lamp-on state and a control of an amount of the energy stored in the third circuit 13. Said storing of the energy may comprise a storage of the energy during a duration of the lamp-off state and a storage of the energy during a second part of the duration of the lamp-on state, which second part should be at least ten times smaller than the first part.

Figure 5:
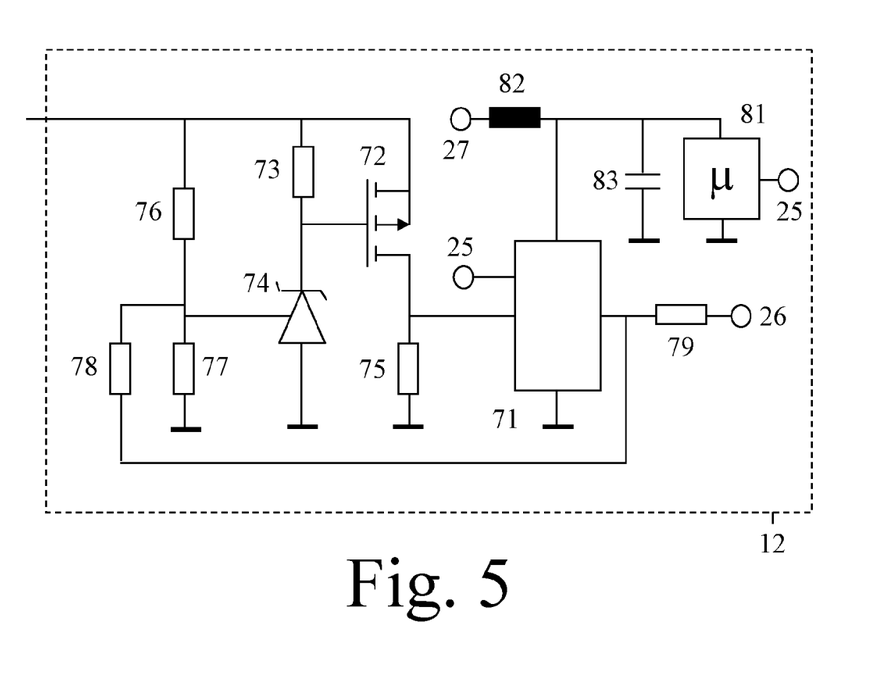
FIG. 5 shows an embodiment of a second circuit.

The second circuit 12 may comprise a programmable microcontroller as shown in the FIG. 5 for said control of the lamp-off state and the lamp-on state. In addition, the programmable microcontroller may have a comparison function for comparing a voltage signal present across the third circuit 13 with a threshold value. Said control of the amount of energy is then performed in response to a comparison result from the programmable microcontroller. Alternatively to the comparison function, the second circuit 12 may further comprise a comparator circuit shown in the FIG. 5 for comparing a voltage signal present across the third circuit 13 with a threshold value. Said control of the amount of energy is then performed in response to a comparison result from the comparator circuit. The third circuit 13 may for example comprise a first capacitor for storing the energy.

The apparatus 1 may further comprise a fourth circuit 14 for increasing a value of a voltage signal present across the third circuit 13 and/or may further comprise a fifth circuit 15 for deriving from a voltage signal present across the third circuit 13 a well defined and stabilized voltage signal for said feeding and/or may further comprise a rectifier 16. However, each one of these circuits 14-16 could be left out, if not required. And each one of these circuits 14-16 could be located outside the apparatus 1.

The first circuit 11 has first and second primary terminals 21, 22 to be coupled to the terminals 3, 4 in case the rectifier

16 is not present. In case the rectifier 16 is present, the first and second primary terminals 21, 22 are to be coupled to outputs of the rectifier 16, and inputs of the rectifier 16 are to be coupled to the terminals 3, 4 of the apparatus 1. The first circuit 11 has first and second secondary terminals 23, 24. The second secondary terminal 24 is to be coupled to (a terminal of) the second circuit 12 and to (a terminal of) the third circuit 13. In case the fourth circuit 14 is present, the first and second secondary terminals 23, 24 are to be coupled to (terminals of) the fourth circuit 14. And in case the fifth circuit 15 is present, the second secondary terminal 24 is to be coupled to (a terminal of) the fifth circuit 15.

Figure 2:
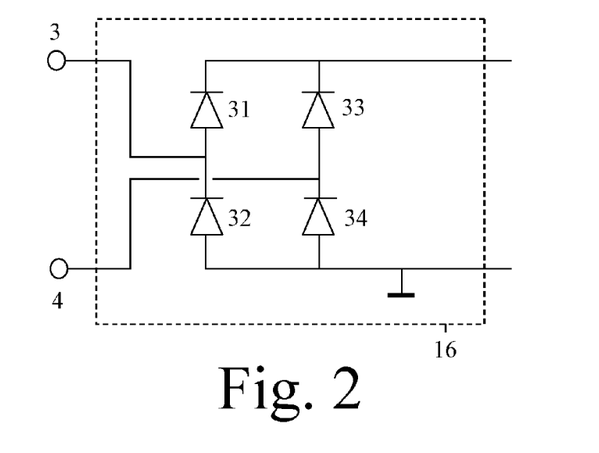
FIG. 2 shows an embodiment of a rectifier.

In the FIG. 2, an embodiment of a rectifier 16 is shown. This rectifier comprises four diodes 31-34 in a diode bridge. A first input of the rectifier 16 is an interconnection between the diodes 31 and 32, and a second input is an interconnection between the diodes 33 and 34. A first output of the rectifier 16 is an interconnection between the diodes 31 and 33, and a second output of the rectifier 16 is an interconnection between the diodes 32 and 34. The second output of the rectifier 16 may further be coupled to ground.

Figure 3:
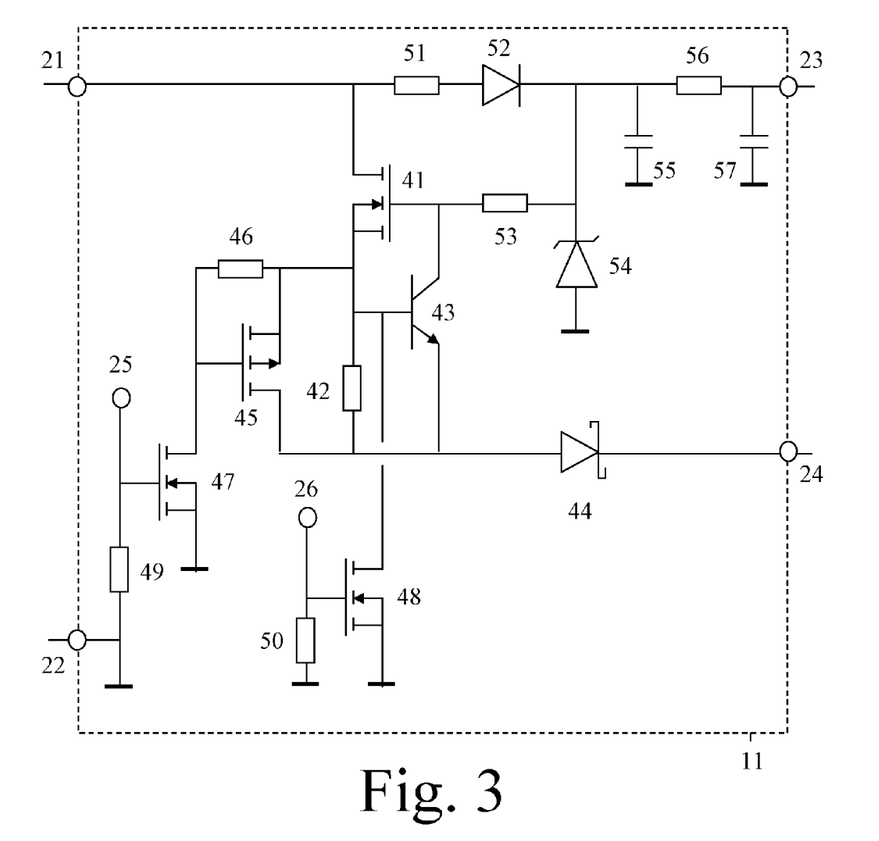
FIG. 3 shows an embodiment of a first circuit.

In the FIG. 3, an embodiment of a first circuit 11 is shown. The first circuit 11 comprises a first transistor 41 having a first main electrode coupled to the first primary terminal 21 and having a second main electrode coupled to one side of a first resistor 42. The first circuit 11 comprises a second transistor 43 having a first main electrode coupled to a control electrode of the first transistor 41 and having a control electrode coupled to the one side of the first resistor 42 and having a second main electrode coupled to another side of the first resistor 42 and to one side of a first diode 44 such as a Schottky diode that is faster and that shows a smaller forward voltage drop and that is more efficient than a usual diode. Another side of the first diode 44 is coupled to the second secondary terminal 24. The first circuit 11 comprises a third transistor 45 having a first main electrode coupled to the other side of the first resistor 42 and having a second main electrode coupled to the one side of the first resistor 42 and to one side of a second resistor 46 and having a control electrode coupled to another side of the second resistor 46. The first circuit 11 comprises a fourth transistor 47 having a first main electrode coupled to the other side of the second resistor 46 and having a second main electrode coupled to the second primary terminal 22 that according to this embodiment is coupled to ground and having a control electrode coupled via a resistor 49 to the second primary terminal 22 and coupled to a terminal 25 for receiving a first control signal from the second circuit 12. The first circuit 11 comprises a fifth transistor 48 having a first main electrode coupled to the one side of the first resistor 42 and having a second main electrode coupled to the second primary terminal 22 (ground) and having a control electrode coupled via a resistor 50 to the second primary terminal 22 (ground) and coupled to a terminal 26 for receiving a second control signal from the second circuit 12.

The first circuit 11 further comprises a third resistor 51 having one side coupled to the first primary terminal 21. The first circuit 11 further comprises a second diode 52 having one side coupled to another side of the third resistor 51. The first circuit 11 further comprises a fourth resistor 53 having one side coupled to another side of the second diode 52 and having another side coupled to the control electrode of the first transistor 41. The first circuit 11 further comprises a third (zener) diode 54 having one side coupled to the other side of the second diode 52 and having another side coupled to the second primary terminal 22 (ground). The first circuit 11 further comprises a second capacitor 55 coupled in parallel to the third diode 54, a fifth resistor 56 having one side coupled to the one side of the third diode 54, and a third capacitor 57 having one side coupled to another side of the fifth resistor 56 and to the first secondary terminal 23 and having another side coupled to the second primary terminal 22 (ground).

Figure 4:
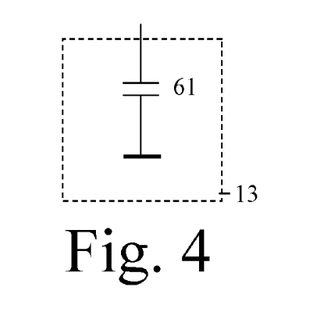
FIG. 4 shows an embodiment of a third circuit.

In the FIG. 4, an embodiment of a third circuit 13 is shown. The third circuit 13 comprises the first capacitor 61 having one side coupled to the second secondary terminal 24 (the other side of the first diode 44) and having another side coupled to the second primary terminal 22 (ground).

In the FIG. 5, an embodiment of a second circuit 12 is shown. The second circuit 12 comprises a gate 71 such as an AND-port having a first input coupled to the terminal 25 for receiving the first control signal from the programmable microcontroller 81 and having an output coupled via a resistor 79 to the terminal 26 for providing the second control signal. The second circuit 12 comprises a comparison circuit 72-77 with a sixth transistor 72 having a first main electrode coupled to a second input of the gate 71 and via a resistor 75 to the second primary terminal 22 (ground) and having a second main electrode coupled to the second secondary terminal 24 (the one side of the first capacitor 61). The comparison circuit 72-77 comprises a sixth resistor 73 having one side coupled to the second secondary terminal 24 (the one side of the first capacitor 61) and having another side coupled to a control electrode of the sixth transistor 72. The comparison circuit 72-77 comprises a shunt regulator 74 having a first main electrode coupled to the control electrode of the sixth transistor 72 and having a second main electrode coupled to the second primary terminal 22 (ground) and having a control electrode coupled to the output of the gate 71 via a resistor 78 for receiving the second control signal. The control electrode of the shunt regulator 74 is further coupled via a resistor 76 to the second secondary terminal 24 (the one side of the first capacitor 61) and via a resistor 77 to the second primary terminal 22 (ground). The second circuit 12 further comprises the programmable microcontroller 81 for said control of the lamp-off state and the lamp-on state. An output of the programmable microcontroller 81 is coupled to the terminal 25 for providing the first control signal. Ground inputs of the gate 71 and the programmable microcontroller 81 are coupled to the second primary terminal 22 (ground). Supply inputs of the gate 71 and the programmable microcontroller 81 are coupled via a capacitor 83 to the second primary terminal 22 (ground) and via an inductor 82 to a terminal 27 for receiving the well defined and stabilized voltage signal from the fifth circuit 15.

Figure 6:
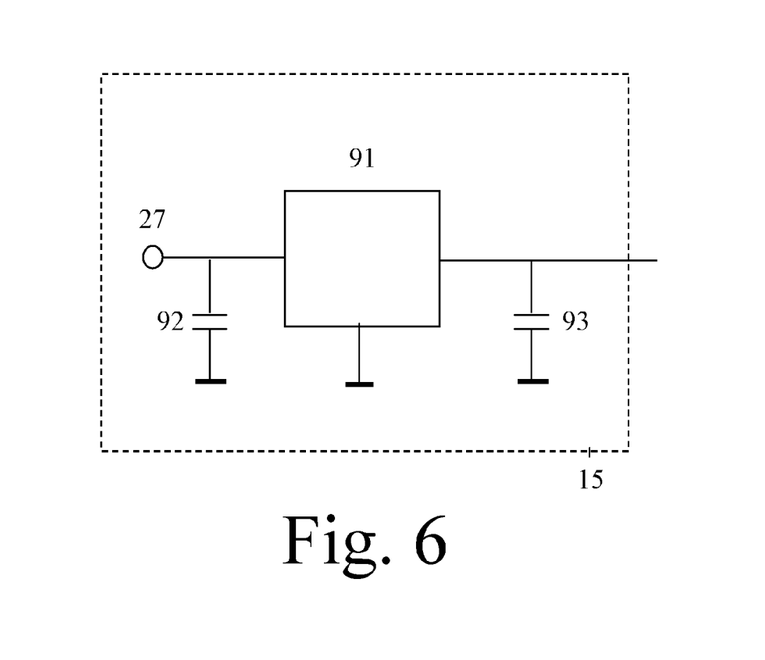
FIG. 6 shows an embodiment of a fifth circuit.

In the FIG. 6, an embodiment of a fifth circuit 15 is shown. The fifth circuit 15 comprises a voltage regulator 91 having an input coupled to the second secondary terminal 24 (the one side of the first capacitor 61) and having an output coupled to the terminal 27 for providing the well defined and stabilized voltage signal. A ground input of the voltage regulator 91 is coupled to the second primary terminal 22 (ground). And the output and the input of the voltage regulator 91 are coupled via capacitors 92, 93 to the second primary terminal 22 (ground).

Figure 7:
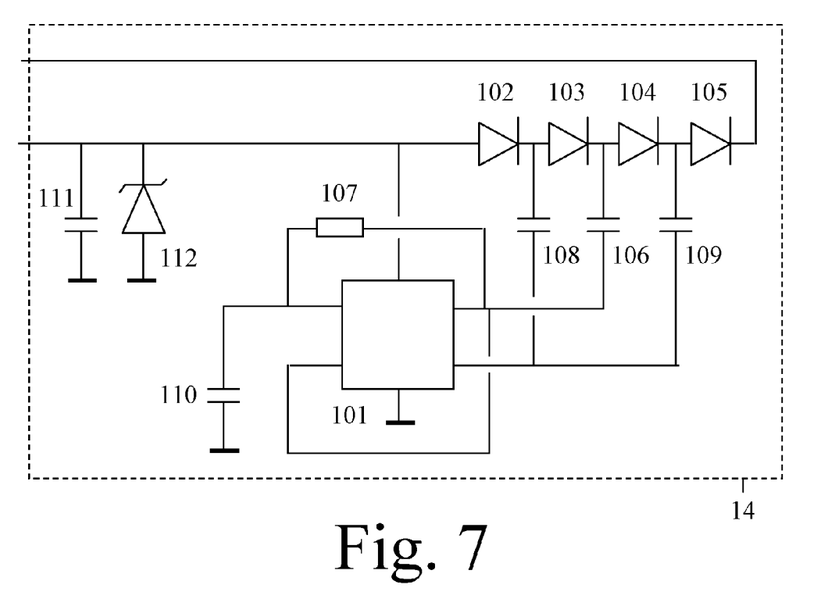
FIG. 7 shows an embodiment of a fourth circuit.

In the FIG. 7, an embodiment of a fourth circuit 14 is shown. The fourth circuit 14 comprises a serial connection of a fourth, a fifth, a sixth and a seventh diode 102, 103, 104, 105, one side of the serial connection being coupled to the second secondary terminal 24 (the one side of the first capacitor 61) and another side of the serial connection being coupled to the first secondary terminal 23 (the one side of the third capacitor 57). The fourth circuit 14 comprises a Schmitt trigger 101 such as an inverting Schmitt trigger having a first output coupled via a fourth capacitor 106 to an interconnection between the fifth and sixth diodes 103, 104 and coupled to one side of a seventh resistor 107 and having a second output coupled via a fifth capacitor 108 to an interconnection between the fourth and fifth diodes 102, 103 and via a sixth capacitor 109 to an interconnection between the sixth and seventh diodes 104, 105. Another side of the seventh resistor 107 is coupled to a first input of the Schmitt trigger 101 and to one side of a seventh capacitor 110, and another side of the seventh capacitor 110 is coupled to the second primary terminal 22 of the first circuit 11 (ground), and the first output of the Schmitt trigger 101 is further coupled to a second input of the Schmitt trigger 101. A ground input of the Schmitt trigger 101 is coupled to the second primary terminal 22 of the first circuit 11 (ground), and a supply input of the Schmitt trigger 101 is coupled to the second secondary terminal 24 (the one side of the first capacitor 61), that is further coupled via a (zener) diode 112 to the second primary terminal 22 of the first circuit 11 (ground) and via a capacitor 111 to the second primary terminal 22 of the first circuit 11 (ground).

The apparatus 1 as shown in the FIG. 1-7 functions as follows. In the lamp-off state, the third and fourth transistors 45, 47 are not conductive (low first control signal via terminal 25) and the fifth transistor 48 is not conductive (low second control signal via terminal 26). The first transistor 41 is operating linearly, the first resistor 42 and the second transistor 43 are operating as current limiters, the relatively high impedance (for example 10, 50 or 100 kOhm and without having excluded other values) is present between the terminals 3, 4 of the apparatus 1, and the first capacitor 61 is charged all the time. In the lamp-on state, during the first part of the duration of the lamp-on state, the first and third and fourth transistors 41, 45, 47 are highly conductive (high first control signal via the terminal 25), as a result the current limiting functions of the first resistor 42 and the second transistor 43 are disabled (bypassed), the fifth transistor 48 is highly conductive (high second control signal via the terminal 26), the relatively low impedance (for example 1, 5 or 10 Ohm and without having excluded other values) is present between the terminals 3, 4 of the apparatus 1, and the first capacitor 61 is de-charged (by the second circuit 12 and the fourth circuit 14 and the fifth circuit 15). As soon as a decreasing amplitude of the voltage signal across the first capacitor 61 has reached the relatively low value, the fifth transistor 48 becomes non-conductive (low second control signal via the terminal 26), and the first capacitor 61 is charged, during the second part of the duration of the lamp-on state, until the increasing amplitude of the voltage signal across the first capacitor 61 has reached the relatively high value, then the fifth transistor becomes highly conductive again (high second control signal via the terminal 26) and a next first part of the duration of the lamp-on state has started etc.

The third resistor 51 and the second diode 52 provide a start-up function. The second and third capacitors 55, 57 and the fifth resistor 56 provide a filter and buffering function. The fourth circuit 14 is based on an oscillator comprising the Schmitt trigger 101 with a feedback loop with a time dependency via the seventh resistor 107 and the seventh capacitor 110 and is based on the diode-capacitor circuit 102-105, 106, 108, 109 for multiplying voltages. This fourth circuit 14 is also called a charge-pump and may be required to bring the first transistor 41 into a well conducting state.

The apparatus 1 can show a minimum dissipation during the full duration of the lamp-off state, during the first part of the duration of the lamp-on state and during the second part of the duration of the lamp-on state.

Many alternatives are possible to the circuits 11-15 as shown in the FIG. 3-7. In the FIG. 3, for example the first resistor 42 and the second transistor 43 may be replaced by other current limiters. In the FIG. 4, the first capacitor 61 may be replaced by a chargeable battery, and more components may be present. In the FIG. 5, the comparator circuit 72-77 may be partly or entirely integrated into the programmable microcontroller 81 or may be replaced by other components, and other transistor/shunt regulator combinations will be possible (a comparator circuit compares voltage input signals at its inputs and produces a voltage output signal at its output in response to a comparison result). The programmable microcontroller 81 is an embodiment only, other kinds of control may be provided, such as a receiver for receiving wireless signals that produces a (first) control signal in response to a reception, an audio detector for detecting audio that produces a (first) control signal in response to a detection, a video detector for detecting video that produces a (first) control signal in response to a detection etc. In the FIG. 6, the voltage regulator 91 may be replaced by separate components (a voltage regulator stabilizes a voltage signal at its input and produces a well defined and stabilized voltage signal at its output). And in the FIG. 7, other diode-capacitor circuits will be possible, and the Schmitt trigger 101 may be replaced by separate components (a Schmitt trigger converts voltage signals at its inputs into voltage output signals at its outputs while introducing a certain amount of hysteresis per input/output combination).

Figure 8:
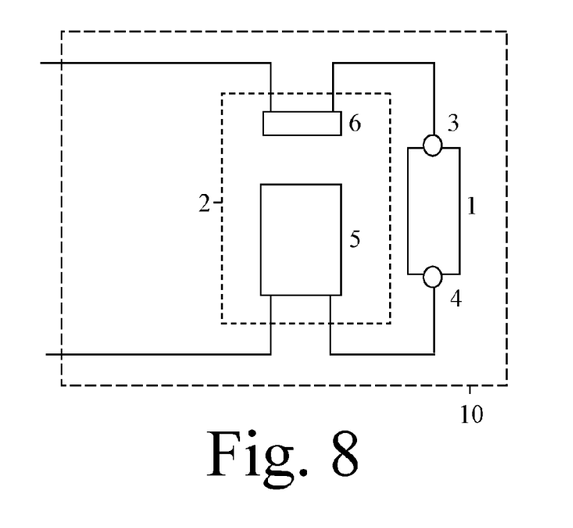
FIG. 8 shows a first embodiment of a device.

In the FIG. 8, a first embodiment of a device 10 is shown. The device comprises the apparatus 1 with its terminals 3 and 4. The terminal 3 is coupled via a fuse 6 located at one end of a lamp 2 for example in the form of a tube to one side of for example a mains supply that produces an alternating current voltage. The terminal 4 is coupled via a driver/light emitting diode combination 5 to another side of for example the mains supply that produces the alternating current voltage. Alternatively, the driver may be located outside the lamp 2.

Figure 9:
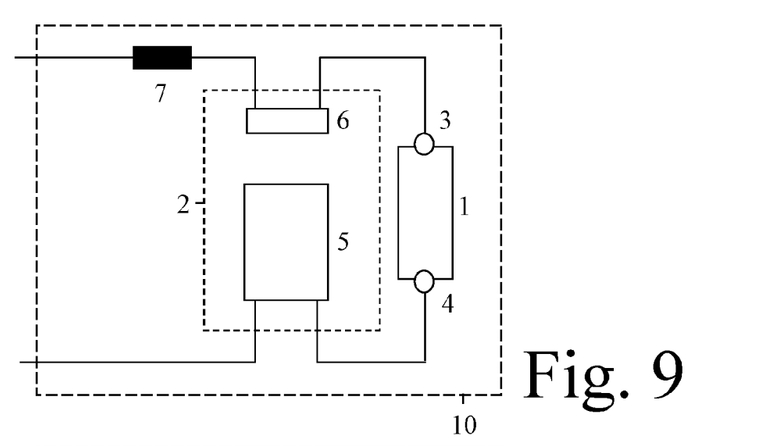
FIG. 9 shows a second embodiment of a device.

In the FIG. 9, a second embodiment of a device 10 is shown, that only differs from the one shown in the FIG. 8 in that a fluorescent ballast 7 here in the form of a serial inductor is present.

Figure 10:
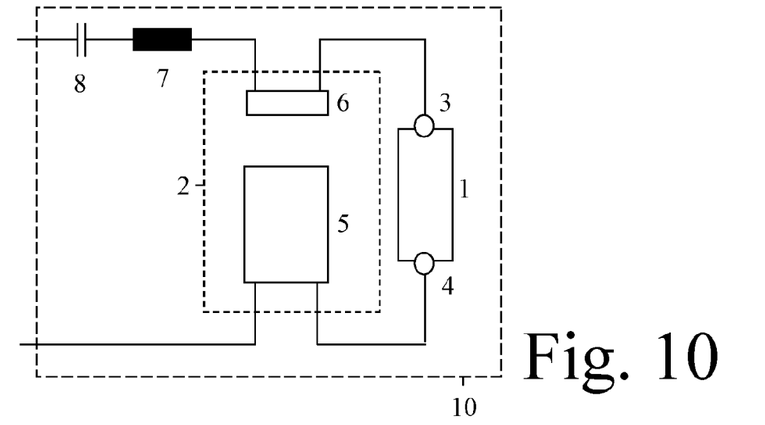
FIG. 10 shows a third embodiment of a device.

In the FIG. 10, a third embodiment of a device 10 is shown, that only differs from the one shown in the FIG. 8 in that a fluorescent ballast 7, 8 here in the form of a serial combination of an inductor and a capacitor is present.

Figure 11:
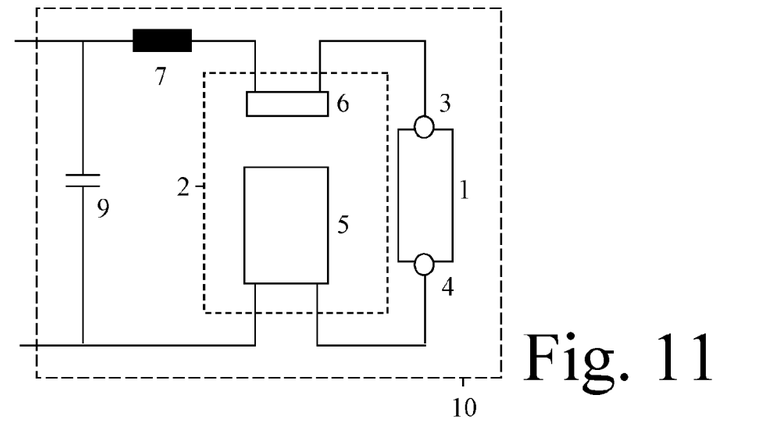
FIG. 11 shows a fourth embodiment of a device.

In the FIG. 11, a fourth embodiment of a device 10 is shown, that only differs from the one shown in the FIG. 8 in that a fluorescent ballast 7, 9 here in the form of a serial inductor with a capacitor located in parallel to the mains supply is present.

When a human being switches-on the mains supply, the programmable microprocessor 81 may for example be programmed such that the lamp 2 is switched-on and that after a while the programmable microprocessor 81 may start certain operations. When a human being switches-off the mains supply, in case no battery is present, the programmable microprocessor 81 may be kept running, as long as there is sufficient energy in the third circuit 13. As soon as the amount of energy available in the third circuit 13 has become insufficient, the programmable microcontroller will stop running. When a human being then switches-on the mains supply, energy will be stored into the third circuit again, and the programmable microcontroller will start running again. Certain synchronization mechanisms may be provided to synchronize the programmable microcontroller after a stop, for example with respect to the date and time. Alternatively or in addition, a clock such as for example a real time clock coupled to the programmable microcontroller may be present. Preferably, a battery is present to bridge the time during which the mains supply is switched-off. Such a battery may be used to keep the real time clock running for many years when the mains supply is switched-off. Alternatively, the programmable microcontroller may comprise a (real time) clock mechanism, in which case the battery may be used to keep (a part of) the programmable microcontroller running when the mains supply is switched-off. Further preferably, the battery and the first capacitor 61 are present in combination.

Summarizing, apparatuses 1 for controlling light emitting diode lamps 2 in serial connections comprise first circuits 11 coupled to terminals 3, 4 of the apparatuses 1 for, in lamp-off states, providing high impedances between the terminals 3, 4 and for, in lamp-on states, providing low impedances between the terminals 3, 4 during first parts of durations of the lamp-on states, second circuits 12 for controlling the first circuits 11, and third circuits 13 for storing energy for feeding the second circuits 12. These apparatuses 1 allow advanced controls of the lamps 2. Said controlling may comprise controls of lamp-off states and lamp-on states and controls of amounts of energy stored in the third circuits 13. Said storing of energy may comprise storages during durations of lamp-off states and storages during second parts of durations of lamp-on states, which second parts are at least ten times smaller than the first parts. The second circuits 12 may comprise programmable microcontrollers 81 for said controls of lamp-off states and lamp-on states.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus for controlling a lamp comprising at least one light emitting diode, the apparatus and the lamp being serially connectable, the apparatus comprising
    a first circuit coupled to terminals of the apparatus for, in a lamp-off state, providing a relatively high impedance between the terminals and for, in a lamp-on state, providing a relatively low impedance between the terminals during a first part of a duration of the lamp-on state, a value of the relatively high impedance being at least ten times larger than a value of the relatively low impedance,
    a second circuit for controlling the first circuit, and
    a third circuit coupled to the first circuit for storing energy for feeding the second circuit,
wherein the second circuit further comprises a comparator circuit for comparing a voltage signal present across the third circuit with a threshold value, said control of the amount of energy being stored in response to a comparison result from the comparator circuit.

2. The apparatus as defined in claim 1, said controlling of the first circuit comprising a control of the lamp-off state and the lamp-on state and a control of an amount of the energy stored in the third circuit, and said storing of the energy comprising a first storage during a first part of a duration of the lamp-off state and a second storage during a second part of the duration of the lamp-on state, the second part being at least ten times smaller than the first part.

3. The apparatus as defined in claim 2, further comprising a fourth circuit for increasing a value of a voltage signal present across the third circuit.

4. The apparatus as defined in claim 2, further comprising a fifth circuit for deriving from a voltage signal present across the third circuit, which is a defined and stabilized voltage signal for said feeding.

5. The apparatus as defined in claim 1, the terminals of the apparatus being coupled to first and second primary terminals of the first circuit that comprises
    a first transistor having a first main electrode coupled to the first primary terminal of the first circuit and having a second main electrode coupled to one side of a first resistor,
    a second transistor having a first main electrode coupled to a control electrode of the first transistor and having a control electrode coupled to the one side of the first resistor and having a second main electrode coupled to another side of the first resistor and to one side of a first diode,
    a third transistor having a first main electrode coupled to the other side of the first resistor and having a second main electrode coupled to the one side of the first resistor and to one side of a second resistor and having a control electrode coupled to another side of the second resistor,
    a fourth transistor having a first main electrode coupled to the other side of the second resistor and having a second main electrode coupled to the second primary terminal of the first circuit and having a control electrode for receiving a first control signal from the second circuit, and
    a fifth transistor having a first main electrode coupled to the one side of the first resistor and having a second main electrode coupled to the second primary terminal of the first circuit and having a control electrode for receiving a second control signal from the second circuit.

6. The apparatus as defined in claim 5, the third circuit comprising a first capacitor having one side coupled to another side of the first diode and having another side coupled to the second primary terminal of the first circuit.

7. The apparatus as defined in claim 6, the first circuit further comprising
    a third resistor having one side coupled to the first primary terminal of the first circuit,
    a second diode having one side coupled to another side of the third resistor,
    a fourth resistor having one side coupled to another side of the second diode and having another side coupled to the control electrode of the first transistor,
    a third diode having one side coupled to the other side of the second diode and having another side coupled to the second primary terminal of the first circuit,
    a second capacitor coupled in parallel to the third diode,
    a fifth resistor having one side coupled to the one side of the third diode, and
    a third capacitor having one side coupled to another side of the fifth resistor and having another side coupled to the second primary terminal of the first circuit.

8. The apparatus as defined in claim 7, the second circuit comprising
    a gate having a first input for receiving the first control signal and having an output for providing the second control signal,
    a sixth transistor having a first main electrode coupled to a second input of the gate and having a second main electrode coupled to the one side of the first capacitor, a sixth resistor having one side coupled to the one side of the first capacitor and having another side coupled to a control electrode of the sixth transistor, and a shunt regulator having a first main electrode coupled to the control electrode of the sixth transistor and having a second main electrode coupled to the second primary terminal of the first circuit and having a control electrode for receiving the second control signal.

9. The apparatus as defined in claim 8, a fourth circuit comprising a serial connection of a fourth, a fifth, a sixth and a seventh diode, one side of the serial connection being coupled to the one side of the first capacitor and another side of the serial connection being coupled to the one side of the third capacitor, a Schmitt trigger having a first output coupled via a fourth capacitor to an interconnection between the fifth and sixth diodes and coupled to one side of a seventh resistor and having a second output coupled via a fifth capacitor to an interconnection between the fourth and fifth diodes and via a sixth capacitor to an interconnection between the sixth and seventh diodes, another side of the seventh resistor being coupled to a first input of the Schmitt trigger and to one side of a seventh capacitor, another side of the seventh capacitor being coupled to the second primary terminal of the first circuit, and the first output further being coupled to a second input of the Schmitt trigger.

10. The apparatus as defined in claim 9, a fifth circuit comprising a voltage regulator having an input coupled to the one side of the first capacitor and having an output for providing a defined and stabilized voltage signal.

11. The apparatus as defined in claim 5, the terminals of the apparatus being coupled to the first and second primary terminals of the first circuit via a rectifier, inputs of the rectifier being coupled to the terminals of the apparatus and outputs of the rectifier being coupled to the first and second primary terminals of the first circuit.

12. A device comprising the apparatus as defined in claim 1 and further comprising the lamp and/or a fluorescent ballast and/or a driver.

13. An apparatus for controlling a lamp comprising at least one light emitting diode, the apparatus and the lamp being serially connectable, the apparatus comprising a first circuit coupled to terminals of the apparatus for, in a lamp-off state, providing a relatively high impedance between the terminals and for, in a lamp-on state, providing a relatively low impedance between the terminals during a first part of a duration of the lamp-on state, a value of the relatively high impedance being at least ten times larger than a value of the relatively low impedance, a second circuit for controlling the first circuit, and a third circuit coupled to the first circuit for storing energy for feeding the second circuit, the second circuit comprising a programmable microcontroller for said control of the lamp-off state and the lamp-on state, wherein the programmable microcontroller having a comparison function for comparing a voltage signal present across the third circuit with a threshold value, said control of the amount of energy being stored in response to a comparison result from the programmable microcontroller.

* * * * *